United States Patent
Choi (10) Patent No.: US 8,547,413 B2
(45) Date of Patent: Oct. 1, 2013

(54) DISPLAY APPARATUS AND CONTROL METHOD THEREOF

(75) Inventor: Jaeyoung Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 293 days.

(21) Appl. No.: 13/021,562

(22) Filed: Feb. 4, 2011

(65) Prior Publication Data

US 2011/0279640 A1 Nov. 17, 2011

(30) Foreign Application Priority Data

May 14, 2010 (KR) ........................ 10-2010-0045405

(51) Int. Cl.
*H04N 7/14* (2006.01)

(52) U.S. Cl.
USPC .................. 348/14.02; 348/14.01; 348/14.12

(58) Field of Classification Search
USPC .................. 348/14.01–14.16; 709/204–205
See application file for complete search history.

(56) References Cited

U.S. PATENT DOCUMENTS

| 5,392,223 | A | 2/1995 | Caci |
| 2003/0104806 | A1 * | 6/2003 | Ruef et al. ..................... 455/422 |
| 2010/0066804 | A1 * | 3/2010 | Shoemake et al. ......... 348/14.02 |
| 2010/0066808 | A1 * | 3/2010 | Tucker et al. .............. 348/14.09 |

FOREIGN PATENT DOCUMENTS

| EP | 0 644 695 A2 | 3/1995 |
| JP | 2003-37825 A | 2/2003 |

* cited by examiner

*Primary Examiner* — Melur Ramakrishnaiah
(74) *Attorney, Agent, or Firm* — Birch, Stewart, Kolasch & Birch, LLP (57) ABSTRACT

Embodiments relate to a display apparatus that can perform video communication and a method of controlling the display apparatus. The display apparatus according to an embodiment includes: a camera for acquiring video data and outputting the video data at a predetermined resolution; a network monitoring unit for detecting an available bandwidth of a network for transmitting video communication data; a resolution adjusting unit for adjusting the output resolution of the camera in accordance with the detected available bandwidth; and a communication unit for transmitting video data outputted from the camera to an external device.

18 Claims, 8 Drawing Sheets

| AVAILABLE BANDWIDTH | OUTPUT RESOLUTION OF CAMERA |
|---|---|
| 6Mbps~ | 1080p |
| 5Mbps~6Mbps | 1080i |
| 4Mbps~5Mbps | 720p |
| 3Mbps~4Mbps | 576p |
| 2Mbps~3Mbps | 576i |
| 1Mbps~2Mbps | 480p |
| 0~1Mbps | 480i |

DISPLAY APPARATUS AND CONTROL METHOD THEREOF

The present application claims priority benefits of Korean Patent Application No. 10-2010-0045405 filed on May 14, 2010 in Republic of Korea, the entire contents of which are fully incorporated by reference.

BACKGROUND OF THE INVENTION

1. Field of the Invention

Embodiments relate to a display apparatus that can make a video call.

2. Description of the Conventional Art

As digital TVs and wire/wireless network technology having the ability of processing and storing signals better than the existing analog TVs have been developed and commercialized, it is possible to provide users with a variety of contents services such as real-time broadcasting, COD (Contents on Demand), games, news, video calls, etc. by using the internet network provided at each home, other than the existing radio media.

An IPTV (Internet Protocol TV) can be an example of the contents services provided through the internet network. The IPTV is to transmit and provide various information services, video contents, and broadcasting to the televisions of users, using the high-speed internet network.

Recently, a broadband TV and a web TV, etc. has been proposed, as a type of network TV that may be further advanced than the IPTV. Unlike the existing IPTV, in the broadband TV or web TV, there are several contents providers and users can be provided with contents that the contents providers provide, such as various VODs and games, by individually connecting to the several contents providers.

It is possible to provide users with various types of information in the network TV system. A method that allows the users to exchange information and contents, and if needed, to make a video call among the users.

SUMMARY OF THE INVENTION

Embodiments provide a display apparatus that can efficiently make a vide call and a method controlling the display apparatus.

An embodiment provides a method of controlling a display apparatus that can make a video call for transmitting video data acquired by a camera, and the method includes: detecting an available bandwidth of a network for transmitting video call data; adjusting an output resolution of the camera in accordance with the detected available bandwidth; and transmitting resolution data of the adjusted resolution outputted from the camera.

Further, another embodiment provides a display apparatus that can perform video communication, which includes: a camera for acquiring video data and outputting the video data at a predetermined resolution; a network monitoring unit for detecting an available bandwidth of a network for transmitting video communication data; a resolution adjusting unit for adjusting output resolution of the camera in accordance with the detected available bandwidth; and a communication unit for transmitting video data outputted from the camera to an external device.

The control methods according to an embodiment can be implemented by one or more computer-readable media where program(s) executed by at least one computer are recorded.

According to an embodiment, the invention provides a method of controlling a digital TV (DTV) that can perform video communication with an external apparatus in a video call operation by using a camera associated with the DTV, the method comprising: detecting, by the DTV, an available bandwidth of a network for transmitting video call data in the video call operation; transmitting, by the DTV to the camera, a control signal for adjusting an output resolution of the camera in accordance with the detected available bandwidth; and transmitting, by the DTV to the external apparatus, video data received from the camera in the adjusted output resolution of the camera for the video call operation.

According to an embodiment, the invention provides A digital TV (DTV) that can perform video communication with an external apparatus in a video call operation by using a camera associated with the DTV, the DTV comprising: at least one processor configured to detect an available bandwidth of a network for transmitting video call data in the video call operation, and to transmit a control signal for adjusting an output resolution of the camera in accordance with the detected available bandwidth; and a communication unit configured to transmit, to the external apparatus, video data received from the camera in the adjusted output resolution of the camera for the video call operation.

According to an embodiment, the invention provides a digital TV (DTV) that can perform video communication with an external apparatus associated with a camera in a video call operation, the DTV comprising: a communication unit configured to receive, from the external apparatus, video data of the video call operation in an adjusted output resolution of the camera associated with the external apparatus, and to receive information on the adjusted output resolution; a display unit; and at least one processor configured to control the display unit to display the received video data of the video call operation in the adjusted output resolution, and to display the received information on the adjusted output resolution.

BRIEF DESCRIPTION OF THE DRAWING

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

Hereafter, a display apparatus and a method controlling the display apparatus according to embodiments of the present invention are described in detail with reference to the accompanying drawings.

Figure 1:
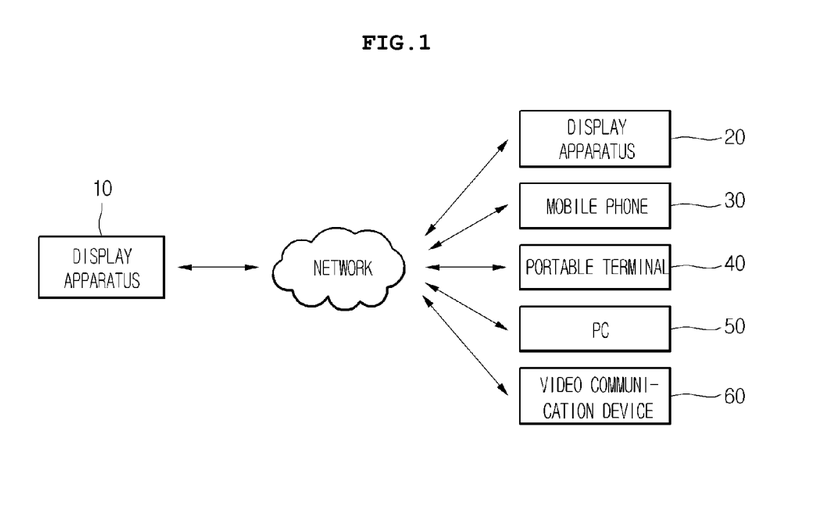
FIG. 1 is a block diagram illustrating the configuration of a video call system according to an embodiment of the invention.

FIG. 1 is a block diagram illustrating the configuration of a video call system according to an embodiment of the invention.

Referring to FIG. 1, a video call system is a system that allows a calling party and a called party to have a conversation (while watching a video transmitted from the counterparts (e.g., a video call operation), using a plurality of devices that can process and transmit/receive video data and voice data. The calling party is the party that places a call (e.g., video call or normal call), and the called party is the party that receives the directed call (call recipient). The video call operation can involve a video conference call, an internet-based video call, etc. using various known networks (wired/wireless). The video call operation may include preferably an exchange of both audio and video data among the involved call parties, but may at sometimes be limited to an exchange of only audio data or only video data depending on capabilities and other factors. Further, two or more parties (e.g., two or more users or devices) may be involved in a video call operation. All the components of the video call system of FIG. 1 are operatively coupled and configured.

For example, in the video call system, a display apparatus 10 can acquire video and voice data corresponding to the user's video and voice, using input devices, such as a camera and a microphone, and transmit the acquired video and voice data to other devices (20 to 60) connected by wire/wireless networks. In this and other embodiments of the invention, wherever the term 'voice' is used, this term is fully interchangeable with 'audio'. That is, although voice data is discussed, this is merely an example of audio data being communicated in a call operation, and the invention fully encompasses communication of any other audio data (e.g., music, sounds, etc.).

According to an embodiment of the present invention, the display apparatus 10 may be preferably a digital TV that receives digital broadcasting and displays videos and other data, and the digital broadcasting can be a type of compressing and transmitting video and voice signals. The display apparatus 10 may also be a mobile terminal, PC, notebook, multimedia player, GPS, etc.

Meanwhile, the display apparatus 10 can receive video and voice data from external devices (20 to 60) connected by wire/wireless networks, and accordingly, video communication is possible between the display apparatus 10 and the other devices 20 to 60. The display apparatus 10 can communicate with one or more external devices 20 to 60 simultaneously, and vice versa. The external devices 20 to 60 may communicate with each other also during a video call operation.

As shown in FIG. 1, an external device that can make video communication with the display apparatus 10 may be another display apparatus 20, a mobile phone 30, a mobile terminal 40 such as a PDA, smart phone, and notebook computer, a PC 50, and a video communication device 60 of the counterparts.

Further, the network(s) connecting the display apparatus 10 with the external devices 20 to 60 allow for transmission and reception of video and voice data according to the communication standards for video communication.

For example, the display apparatus 10 and the external devices 20 to 60 can transmit/receive video and voice data, using a network according to Ethernet or IEEE802.3, or can transmit/receive the video and voice data, using a wireless network according to IEEE 802.11.

Meanwhile, the network allows for data transmission and reception between the display apparatus 10 and the external devices 20 to 60, by using a VoBB (voice over broadband) or a legacy service. To be more specific, the VoBB may include a service, such as VoCM (voice over cable modem), VoDSL (voice over DSL), VoIP (voice over Internet protocol), FWA (fixed wireless access), FTTH (fiber to the home), or VoATM (voice over ATM), etc.

On the other hand, the legacy service may include ISDN (integrated service digital network), POTS (plain old telephone service), cellular or 3G service, etc.

Therefore, the display apparatus 10 and the external devices 20 to 60 can transmit/receive video and voice data, using data networks, such as a wireless network, the existing telephone network, and internet, a cable modem system, or a cellular network, etc.

Meanwhile, the display apparatus 10 and the external devices 20 to 60 can transmit/receive video/voice data under the rules set therebetween, and for example, may use protocols, such as H.261 standard for coding video data, H.211 standard for video/voice data communication, and H.242 standard for call setting and cancel. In detail, protocols implemented from video communication standards, such as H.323, H.263, and H264 standards for video coding and G723.1, G.711, and G.729 for voice coding may be used for a video communication system using the internet.

The video communication system according to an embodiment of the present invention, however, is not limited to the configurations described above. For example, the devices 20 to 60 making a video communication with the display apparatus 10 are not limited to the devices 20 to 60 shown in FIG. 1, and standards, such as SIP, RTP/RTCP protocols, other than the standards described above, may be used.

Figure 2:
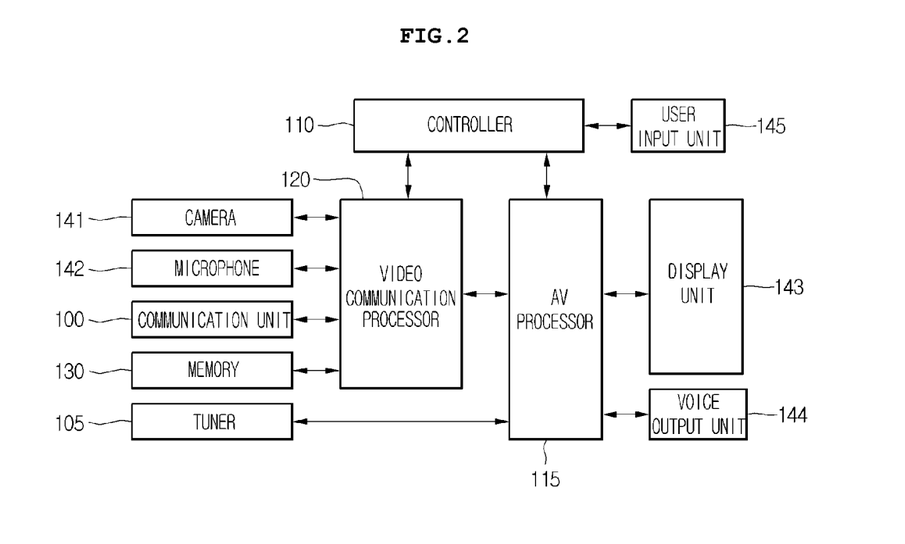
FIG. 2 is a block diagram schematically illustrating the configuration of a display apparatus according to a first embodiment of the present invention.

FIG. 2 is a block diagram illustrating the configuration of the display apparatus 10 according to a first embodiment of the present invention, in which the display apparatus 10 may includes a communication unit 100, a tuner 105, a controller 110, an AV (audio and/or video) processor 115, a video call processor (or video communication processor) 120, a memory or storage unit 130, a camera 141, a microphone 142, a display (or display unit) 143, a voice output unit 144, and a user input unit 145. The camera 141 (or any camera in other embodiments) can be built into the display apparatus 10 such the DTV, or can be a separate device connected to the display apparatus 10.

Referring to FIG. 2, the communication unit 100 is connected with a display apparatus (or external device) of a counterparts or with a server for video communication service and can transmit/receive video communication data. For example, the communication unit 100 can transmit a transmission stream including AV data corresponding to the user's video and voice to an external device, for example, a display apparatus of the counterpart, through a wire/wireless network.

Further, the communication unit 100 can also receive a reception stream including AV data corresponding to the counterpart's video and voice in the video communication, from the display apparatus of the counterpart.

In detail, the communication unit 100 is connected with the counterpart's display apparatus by Ethernet or wire/wireless network, such as IEEE 802.3, IEEE 802.11 and can transmit/receive AV data according to a vide call with the counterpart's display apparatus.

The video call processor 120 can process and output video communication data, e.g., user's AV data that is acquired by the camera 141 and the microphone 142, and the counterpart's AV data received through the communication unit 100, in accordance with a predetermined video communication method, e.g., a video communication standard, for example, H.323, H.263, or H264 standard for video data or G723.1, G.711, or G.729 for voice data. For example, the video call processor 120 can encode the video data in accordance with the standards, such as H.323, H.263, and H.264, and output an elementary stream type of video stream, which may be the basis stream of digital data. Further, the video call processor 120 can encode the voice data in accordance with the standards, such as G.723.1, G.711, and G.729, and output an elementary stream type of voice stream.

The AV processor 115 can convert the video communication data outputted from the video call processor 120, for example, the user's video/voice data and the counterpart's video/voice data in a video call, into a format that can be outputted from the display unit 143 and the voice output unit 144.

For example, the AV processor 115 can process the call videos of the user and the counterpart to be able to be outputted on the display unit 143, using the video communication data processed by the video call processor 120.

The AV processor 115 can process the call voices of the user and the counterpart to be able to be outputted by the output unit 144, using the video communication data processed by the video call processor 120. Further, the AV processor 115 can convert the contents outputted from the outside or stored in the display apparatus 10 into a format that can be outputted from the display unit 143 and/or the voice output unit 144.

Referring to FIG. 2, the AV processor 115 can process a digital broadcasting signal received through the tuner(s) 105 to be able to be outputted from the display unit 143 and/or the voice output unit 144.

To be more specific, the AV processor 115 converts the call videos according to the video communication data received by the communication unit 100 and the contents videos according to the broadcasting signal inputted through the tuner 105 into format(s) that can be displayed, and accordingly the display unit 143 can display at least one of the call videos and the contents videos on the screen(s) of the display unit 143. Here, the call videos can be videos associated with a video call operation, such as images of the parties involved in the video call, and the contents videos can be broadcast programs, TV programs, broadcast data such as EPG or advertisement data, etc. The AV processor 115 may perform pre-processes for improving or adjusting the quality of video to fit to a specific object, such as readjusting brightness, removing a noise, smoothing, and sharpening.

The memory 130 can store programs and data for the operations of the display apparatus or user's information, etc. The camera 141 takes pictures (e.g., shots or moving videos) of the area around the display apparatus, e.g., the area including the user, and can acquire and output video data corresponding to such pictures. Meanwhile, the camera 141 may be attached to a side of the main body of the display apparatus, such as a Web Cam, and thus may be arranged to take a picture of the front area of the display apparatus where the user(s) may be positioned. As such, the camera 141 takes images (e.g., shots or moving images) of the user(s) positioned in front of the camera 141 and can send the images of the user(s) to the apparatus(es) of the other party(ies) involved in the video call operations under control of the controller 110.

The microphone 142 collects sounds including voice generated around the display apparatus, e.g., the user's voice, and can output voice data corresponding to the sounds. Meanwhile, the microphone 142 may be attached to one side of the main body of the display apparatus or disposed outside the display apparatus, for example, adjacent to the user.

The display unit 143 displays the user's video acquired by the camera 141, e.g., a call video to be transmitted to the display apparatus of the counterpart, and can display the counterpart's call video received by the communication unit 100, while it can display videos of the contents inputted from the outside or stored therein. For example, the display unit 143 can display videos, using various types of display panels, such as a DLP (Digital Light Processing), an LCD (Liquid Crystal Display), and PDP (Plasma Display Panel). The display unit 143 can be a touch-sensitive screen so that the user's input may be entered using such screen. Further, the voice output unit 144 outputs the user's call voice acquired by the microphone 142 and can output and transmit the counterpart's call voice received through the communication unit 100 to the user.

The user input unit 145 may be provided with a plurality of key buttons for the user's input, or may display a plurality of key buttons on a touch panel, such that it can receive inputs for controlling the operation of the display apparatus 10. Meanwhile, the user input unit 145 may be disposed outside the display apparatus 10, and for example, may be a remote controller having a plurality of key buttons for user's input. The user input unit 145 may be a keypad or keyboard (soft or hard keys), a mouse, a touch-sensitive screen, etc.

The controller 110 controls the entire operation of the display apparatus described above, and can control the video call processor 120, the AV processor 115, and the user input unit 145, respectively. The display apparatus 10 can receive a video and/or a voice call according to an internet telephone service through the VoIP (Voice Over Internet Protocol) network, but the present invention is not limited thereto and can receive a normal telephone call using the PSTN(Public Switched Telephone Network) or a mobile phone call using a mobile communication network.

According to an embodiment of the present invention, the display apparatus 10 can detect the available bandwidth of the network for transmitting/receiving data according to a video call with a video call device 60 of a counterpart, adjust the resolution of the video data acquired by the camera 141 in accordance with the detected available bandwidth, and transmit the acquired video data in the adjusted resolution to the counterpart's device(s).

Therefore, it is possible to prevent the quality of a video call from being deteriorated due to an insufficient available bandwidth or unstable network state, and to improve the quality of a video call while reducing errors in video communication.

Figure 3:
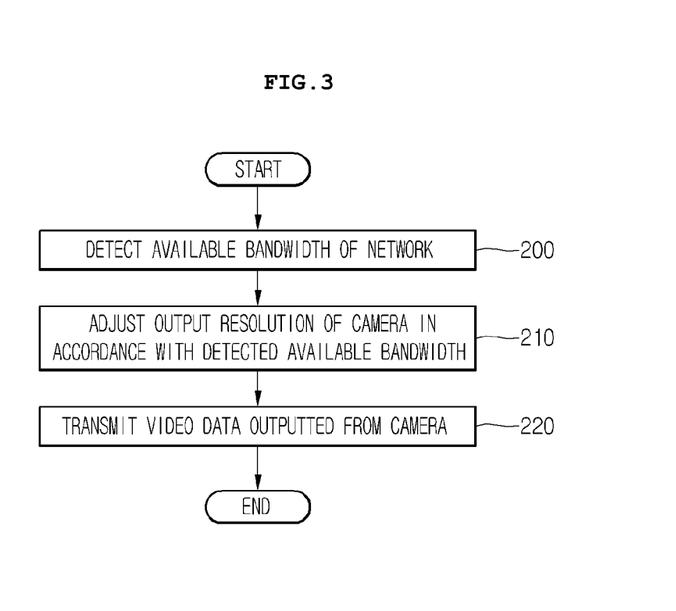
FIG. 3 is a flowchart illustrating a method of controlling a display apparatus according to an embodiment of the present invention.

FIG. 3 is a flowchart illustrating a method of controlling a display apparatus according to an embodiment of the present invention and the control method illustrated in FIG. 3 is described in connection with the block diagram illustrating the configuration of the display apparatus according to the embodiment of the present invention shown in FIG. 2. The methods of FIG. 3 or other figures/examples of the invention can, however, be equally implemented using other display apparatus.

Referring to FIG. 3, the video communication/call processor 120 of the display apparatus 10 that can perform video communication detects the available bandwidth of a network for transmitting/receiving data with a counter-part's video communication device 60 (or other device 20, 30, 40, or 50) (step 200). For example, the video call processor 120 uploads and downloads data having a predetermined size from the network by using the communication unit 100 and can estimate the available bandwidth by dividing the size of the uploaded or downloaded data by the time taken for the communication. Any known technique of estimating the network's available bandwidth can be used.

For instance, the video call processor 120 can measure the available bandwidth of the network in a predetermined period, using the method described above, or various other bandwidth measuring methods. The video call processor 120 adjusts the output resolution of the camera 141 in accordance with the detected available bandwidth of the network (step 210). For instance, the video call processor 120 may send a control signal to the camera 141 to adjust its output resolution. The camera 141 acquires video data corresponding to the user's image and can output the acquired video data with any one of a plurality of resolutions, which have been set in advance, according to the control signal. Therefore, the video call processor 120 can determine the most suitable output resolution for the detected available bandwidth, e.g., an output resolution where the data can be stably transmitted without an error or minimal error by using the network having the available bandwidth, in the resolutions that the camera 140 can output.

In more detail, the less the detected available network bandwidth, the more the video call processor 120 can reduce the output resolution of the data, and accordingly, it is possible to prevent data transmission errors with the decreased amount of video data transmitted for video communication. In this case, the camera 141 outputs the user's video data for a video call at the resolution adjusted by the video call processor 120, and for this operation, may be equipped with an encoder for adjusting the output resolution. For instance, when the available network bandwidth is detected to be smaller than a predetermined reference value, then the video communication processor 120 may reduce the output resolution of the camera 141 so that less video data (e.g., video of the user) in the reduced output resolution may be output from the camera 141. As such, the video data in the reduced output resolution can be effectively transmitted through the network according to the currently available network bandwidth. On the other hand, when the available network bandwidth is detected to be larger than a predetermined reference value, then the video communication processor 120 may increase the output resolution of the camera 141 so that more detailed video data (e.g., video of the user) in the enlarged output resolution may be output from the camera 141. As such, the video data can be transmitted in a most suitable format or resolution through the network according to the currently available network bandwidth.

Thereafter, the communication unit 100 transmits the video data outputted from the camera 141 (step 220). That is, the communication unit 100 receives the video data having the output resolution adjusted from the camera 141 and can transmit the video data in the adjusted output resolution to the video communication device 60. As such, the video communication device 60 of the counterpart can receive the video data of the video call operation from the display apparatus 10 in a timely manner without network delay or with a minimal network delay.

On the other hand, as described with reference to FIG. 3, the operation of the video call processor 120 may be achieved by another module of the display apparatus 10 shown in FIG. 2, for example, the controller 110. In such a case, the controller 110 can communicate directly with the camera 141, or can communicate with the camera 141 through the video call processor 120.

Figure 4:
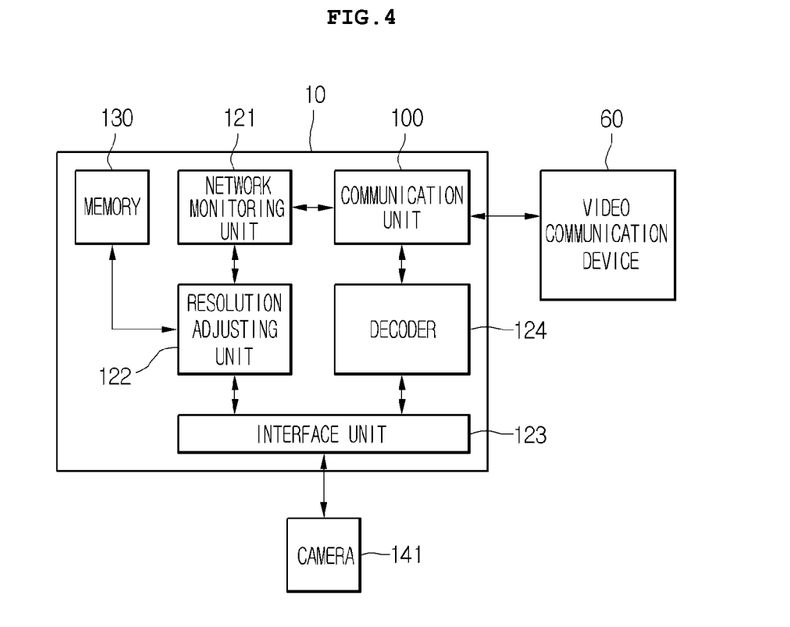
FIG. 4 is a block diagram schematically illustrating the configuration of a display apparatus according to a second embodiment of the present invention.

FIG. 4 is a cross-sectional view showing the configuration of the display apparatus 10 according to a second embodiment of the present invention and, in the operation of the display apparatus shown in FIG. 4, the same parts as those described in connection with FIGS. 2 and 3 may not be repeated below.

Referring to FIG. 4, the display apparatus 10 includes a communication unit 100, a network monitoring unit 121, and a resolution adjusting unit 122, and the camera 141 may be disposed outside the display apparatus 10 or can be part of the display apparatus 10. At least one of the network monitoring unit 121, the communication unit 100 and the resolution adjusting unit 122 can be part of one or more processors. Further, a controller or processor that performs the operations of the network monitoring unit 121 and the resolution adjusting unit 122 may be provided. All components of the display apparatus 10 are operatively coupled and configured.

The camera 141 can be connected and transmit/receive data to/from the display apparatus 10 by using an interface unit 123, for example, a USB (Universal Serial Bus), and may be attached to one side, for example, the top of the display apparatus 10. The display apparatus 10 can be connected with the video communication device 60 of the counterpart in a vide call by wire/wireless networks, such as Ethernet, IEEE 802.3, or IEEE 802.11, and transmit/receive video/voice data in the video call.

According to an embodiment of the present invention, the video communication device 60 of the counterpart, as shown in FIG. 1 or 4, may be a display apparatus 20, a mobile phone 30, a portable terminal 40, such as a PDA or a notebook computer, or a PC 50.

The camera 141 outputs video data corresponding to the user's image at the resolution set or adjusted by the method of adjusting the output resolution of the camera as described above, and the output video data in the adjusted resolution can be inputted to the display apparatus 10 through the interface unit 123. Meanwhile, the video data inputted to the display apparatus 10 from the camera 141 is decoded by a decoder 124 and can be converted into a format that can be transmitted to the video communication device 60 of the counterpart in accordance with the video call standards.

The communication unit 100 can receive the video data having the resolution adjusted in accordance with the current network state, e.g., the available bandwidth of the network, as described above, from the vide data decoder 124, and can transmit the video data in the adjusted resolution to the video communication device 60 of the counterpart.

According to another embodiment of the present invention, the communication unit 100 may transmit the user's video/voice data to a server for a video communication service, and may not directly transmit the video/voice data to the video communication device 60 of the counterpart.

The network monitoring unit 121 can detect the current state of the network for transmitting video data, e.g., the network connected with the video communication device 60 of the counterpart or the video communication server (not shown), using the data transmitted/received through the communication unit 100. For example, the network monitoring unit 121 can transmit one or more TCP (Transmission Control Protocol)/UDP(User Datagram Protocol) packets to the video communication device 60 through a network for a predetermined time, in which the packet may be transmitted for a predetermined time by saturating the transmission bandwidth of the packet higher than the maximum available bandwidth of the network.

Thereafter, the network monitoring unit 121 can measure packet loss and the available bandwidth by comparing the number of packets transmitted per hour and the number of packets received to the video communication device 60 of the counter part. That is, the available bandwidth of the network can be defined by S/T, assuming that the transmission time of packet is T and the periodic packet size is S.

The resolution adjusting unit 122 can adjust the current state of the network which is detected by the network monitoring unit 121, for example, the output resolution of the camera 141 in accordance with the available bandwidth of the network, and the adjusted output resolution value or data can be transmitted to the camera 141 through the interface unit 123. Such an adjustment of the output resolution of the camera 141 may occur periodically, automatically, or at a desired time, e.g., when the detected network bandwidth is above or below a certain level. In order to periodically adjust the output resolution of the camera 141, the network monitoring unit 121 can periodically measure the available bandwidth of the network by using the method described above and transmit it to the resolution adjusting unit 122, and the resolution adjusting unit 122 can periodically adjust the output resolution of the camera 141 in accordance with the available bandwidth of the network.

As described above, the resolution adjusting unit 122 can prevent deterioration of the quality of the video call by reducing the output resolution of the camera 141, as the detected available bandwidth of the network decreases, and can also increase the output resolution of the camera 141 when the available bandwidth increases. In this case, since the resolution of the video data and the image quality of the call video may not be linearly proportionate, the resolution adjusting unit 122 may not adjust the output resolution of the camera 141 such that it is linearly proportionate to changes in the detected available bandwidth of the network.

For this purpose, a lookup table formed by connecting a plurality of possible available network bandwidths with a plurality of possible video resolutions may be provided or prestored in the display apparatus 10 or in the server communicating with the display apparatus 10. The lookup table may be constructed by pre-measured experimental data, e.g., data according to the size or the resolution of video data suitable for the available bandwidth of the network.

The resolution adjusting unit 122 extracts the video resolution corresponding to the available network bandwidth by entering the detected available network bandwidth into the lockup table and can determine the output resolution of the camera 141 corresponding to the entered detected available network bandwidth. Meanwhile, the lookup table can be stored in the memory of the display apparatus 10 and may be changed and stored in accordance with the performance of the camera 141 connected to the display apparatus 10, for example, whether an encoder is provided, or the supportable output resolution, etc. The lookup table can be periodically, automatically or at a desired time updated in view of the properties of the camera 141 currently connected and/or the network states and/or the states of the display apparatus 10.

Figure 5:
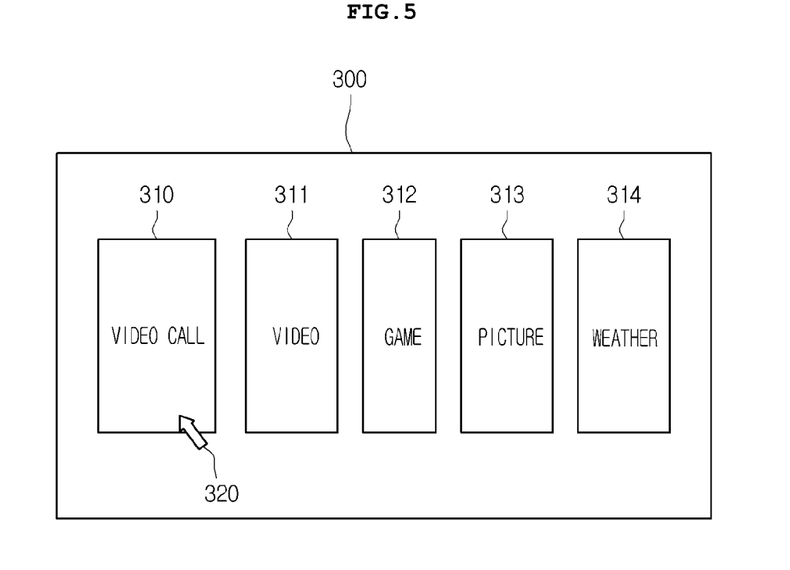
FIG. 5 is a diagram showing an embodiment of a method of providing a video call service from a display apparatus.

FIG. 5 is a diagram showing an embodiment of a method of providing a video call service from a display apparatus. This method may be implemented in a display system. The display system according to an embodiment of the present invention may be composed of a network manager, a contents provider (CP), and a service provider, and a display apparatus. Further, the method of FIGS. 5-16 may be implemented by the display apparatus of FIG. 1, 2 or 4.

The network manager may provide basic software needed for contents provided from the contents provider to properly operate in the display apparatus 10. Further, it is possible to provide the contents provider with hardware information of the display apparatus 10 which is needed for the contents to operate in the display apparatus 10. For example, the network operator provides a main image implemented when the contents provided from the contents providers are displayed on the display apparatus 10, and may provide a user interface for users to select the contents or input various instructions and display corresponding outputs. Further, the user interface can also provide information for updating the firmware and/or the software of the display apparatus 10, every time it is needed or periodically.

The contents provider produces a variety of contents that can be provided on the network and makes them in a format that the display apparatus 10 can play, and can provide the contents in accordance with a request of the display apparatus 10. The contents may be predetermined data that can be serviced by the network. The service provider may be an internet service provider that provides network communication among the network operator, the contents provider, and the display apparatus 10.

The display apparatus 10 receives and plays or executes contents from the service provider in response to a request of a user. For example, the display apparatus 10 may include a broadcasting receiver, such as a network set-top box, and predetermined devices equipped with a network module, such as a telephone for network. For example, the contents provider may be an operator that produces various contents to provide to the display apparatus 10. The contents provider may include a TV station, a radio station, a VOD operator, an AOD operator, a game operator, a video communication service provider, a weather information provider, a photo-related service provider, etc.

In more detail, the video communication service provider may provide a relay service to allow for a video call with a user who uses another network TV, through the network.

The display apparatus 10 preferably has a network interface to be able to be connected to a network and is provided with an IP address to process data packets through the network, and may store or play the data packets when the data packet is multimedia data, such as a video or audio. Further, the display apparatus 10 may perform bidirectional transmission of the user's requests while processing the multimedia data, and for this operation, a remote controller for controlling the display apparatus 10 may be provided with buttons or other selectable means for controlling the network TV, e.g., buttons for selecting a variety of menus.

Referring to FIG. 5, the menu image of the display apparatus 10 may include icons 310 to 314 representing a plurality of contents providers. The icons 310 to 314 display in the image 300 displayed on the screen of the display apparatus 10 may represent buttons for connecting to the contents providers' servers and a user can be provided with contents service(s) by selecting one of the icons 310 to 314 to be connected to the contents providers' servers. According to an embodiment of the present invention, at least one of the contents providers provide a video communication service, and accordingly, any one of the icons 310 to 314 in the image 300 of the display apparatus 10, for example, a 'video call' icon 310 may be an icon corresponding to the video communication service. For instance, the user may select the 'video call' icon 310 to start a video call with another device/user such as at least one of the external devices 20, 30, 40, 50, 60, or to start a video communication with a server such as a server of a service provider or contents provider.

The user can be connected to the server of a contents provider by selecting the 'video call' icon 310 in the icons 310 to 314 on the screen 300 of the display apparatus 10, and thus can be provided with the video communication service. The user input unit 145 may be an input unit for selection as described above, and for example, may be a remote controller connected with the display apparatus 10 by wire or wireless communication, or a device for sensing a movement of the parts of a body, such as the user's fingers or eyes. For example, the remote controller may be an input unit, such as a spatial remote controller or a mouse, which can recognize a motion of the user and transmit a signal corresponding to the motion to the contents player.

Further, the display apparatus 10 may be equipped with a touch panel for sensing a contact point of a specific object or movement of the contact object, and accordingly, the user can perform the selection described above by touching the screen with the finger(s) or a specific object. Meanwhile, the display apparatus 10 may be provided with a sensing unit that can sense a movement of the user's eyes, and accordingly, it is possible to receive an input from the user in accordance with the movement of the user's eyes.

Referring to FIG. 5, a pointer 320 that moves with the movement of the input unit, as described above, may be displayed on the screen of the display apparatus 10, such that the pointer 320 can indicate the position that the user intends to point out with the input unit.

According to another embodiment of the present invention, some of the operation for adjusting the output resolution of the camera 141 described with reference to FIG. 3 may be performed in the server of the video communication service provider.

Hereafter, a method of changing and transmitting the resolution of a video call is described in detail with reference to FIGS. 6 to 11.

Figure 6:
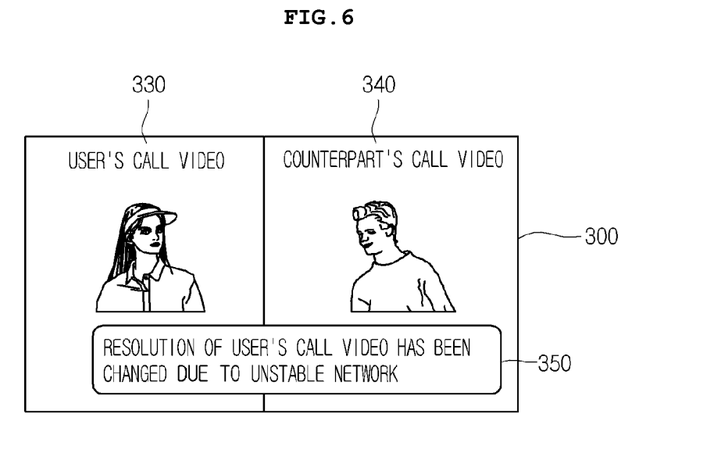
FIGS. 6 to 11 are diagrams showing an embodiment of a method of changing the resolution of a video call image and transmitting the changed video call image.

Referring to FIG. 6, a display unit of the display apparatus 143 can display the video in a video call, for example, the user's call video 330 and the counterpart's call video 340 on a screen 300. In this example, the user's call video 330 may be an image (snap shot or moving image) of the user, and the counterpart's call video 340 may be an image (snap shot or moving image) of the counterpart, where the user and counterpart are currently having a video call or are to have or start a video call.

According to an embodiment of the present invention, the network monitoring unit 121 can periodically measure the available bandwidth of the network by using the method described above at the start of a video call or in or during the video call, and the resolution adjusting unit 122 can determine the video resolution corresponding to the available bandwidth measured with reference to the lookup table stored in the memory 130 as the output resolution of the camera 141. As such, the video data of the video call output from the camera of the user's device or counterpart's device can be automatically adjusted to be most suitable for the currently available bandwidth of the network. Further, a message indicating that the resolution of the video call has been modified due to unstable network (or for some other reason) may be displayed on the screen of the user's device 10.

Figure 7:
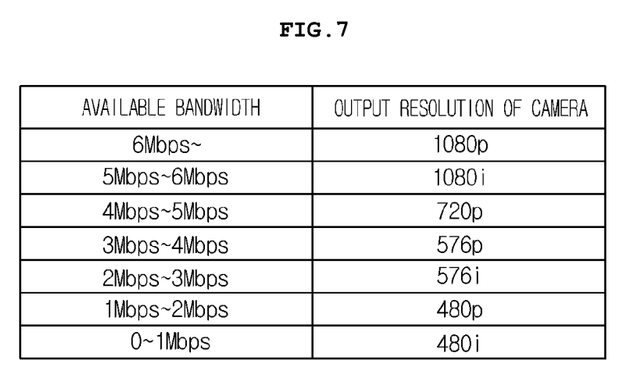

FIG. 7 is a diagram showing an embodiment of the configuration of a lookup table stored in the memory 130 or other storage unit associated with the display apparatus.

Referring to FIG. 7, the lookup table can be constructed by storing a plurality of available bandwidth periods in association with the possible output resolutions of the camera 141 as shown, and the resolution adjusting unit 122 can determine the resolution corresponding to the period where the detected available bandwidth is included, as the currently suitable output resolution of the camera 141, by locating the measured available bandwidth in the lookup table. For example, when the available network bandwidth measured by the network monitoring unit 121 is within "4 Mbps~5 Mbps", the resolution adjusting unit 122 can determine that "720 p" corresponds to the measured network bandwidth from the lookup table, and adjusts the output resolution of the camera 141 into "720 p" based on the determination using the lookup table.

In another example, when the detected available network bandwidth is determined to be within "1 Mbps~2 Mbps", the resolution adjusting unit 122 can decrease the output resolution of the camera 141 to "480 p" according to the lookup table. When the detected available network bandwidth exceeds 6 Mbps, the resolution adjusting unit 122 can increase the output resolution of the camera 141 to "1080 p" according to the lookup table. The resolutions in the lookup table are video output resolutions that can be supported by the camera 141, and for example, in the lookup table shown in FIG. 7, the camera 141 connected to the display apparatus 10 can support output resolutions of 1080 p, 1080 i, 720 p, 720 i, 576 p, 576 i, 480 p, and 480 i.

According to an embodiment of the present invention, a graphic user interface (GUI) showing information on changes in the output resolution of the camera 141 described above can be displayed on the screen 300 of the display apparatus 10. For example, when the network available bandwidth decreases and the resolution adjusting unit 122 correspondingly decreases the output resolution of the camera 141, as shown in FIG. 6 a pop-up window 350 including information on the resolution change, e.g., indicating "resolution of user's call video has been changed due to unstable network" can be displayed on the screen 300 by an OSD (On Screen Display) to be shown to the user.

Meanwhile, the pop-up window 350 showing the output resolution change described above may further include information on the detected available network bandwidth, in addition to information on the camera's output resolution change.

Figure 8:
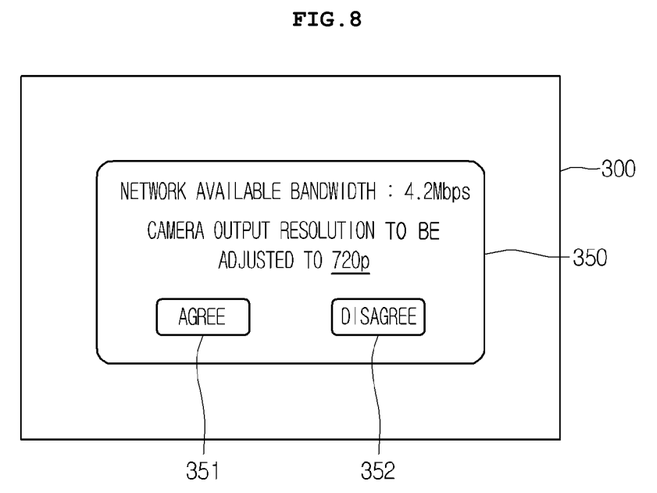

Referring to FIG. 8, the pop-up window 350 displayed on the screen 300 may include information on the currently available bandwidth of the network which has been measured by the network monitoring unit 121, and information on the output resolution of the camera 141 which can be adjusted to in accordance with the measured available bandwidth. For example, the pop-up window 350 shows information that the current available bandwidth of the network is "4.2 Mbps" and the output resolution of the camera can be adjusted in accordance with the available bandwidth of "4.2 Mbps" to "720 p", and buttons 351, 352 allowing a user to select to change or not change the resolution may be displayed.

For example, the user can select an "agree" button 351 to change the output resolution of the camera 141 to "720 p" that is suitable for the current available network bandwidth, and in response to the user's agreement, the output resolution of the camera 141 is changed to "720 p" and the video data having the resolution of "720 p" (changed resolution) can be transmitted to the video communication device 60 of the counterpart.

On the other hand, when the user selects a "disagree" button 352, the current output resolution of the camera 141 is not changed and is maintained regardless of the measured available network bandwidth. In the example of FIG. 8, the user can make a final decision as to whether or not the output resolution of the camera is adjusted according to the currently available network bandwidth. In another example, the display apparatus automatically changes the output resolution of the camera according to the detected available network bandwidth.

According to another embodiment of the present invention, the resolution adjusting unit 122 can determine the output resolution of the camera 141, on the basis of the display-supportable video resolution of the display apparatus 10 or the video communication device 60 of the counterpart. For example, the resolution adjusting unit 122 can determine whether the display apparatus 10 can play the video data according to the determined output resolution of the camera 141, by comparing the output resolution of the camera 141 which has been determined in accordance with the available network bandwidth by the method described with reference to FIGS. 3 to 8 with the supportable resolution of the display apparatus 10.

When the display apparatus cannot play or display the video data having the output resolution of the camera 141 that has been determined in accordance with the available network bandwidth as discussed above, the resolution adjusting unit 122 can adjust the determined output resolution of the camera 141 to any one of the supportable resolutions of the display apparatus 10. In more detail, when the determined output resolution of the camera 141 (to be adjusted) exceeds the maximum supportable resolution of the display apparatus 10, the resolution adjusting unit 122 can reduce the output resolution of the camera 141 to the maximum supportable resolution of the display apparatus 10. In this way, the resolution adjusting unit 122 can reduce, maintain or enlarge the output resolution of the camera 141 according to the supportable resolutions of the display apparatus 10.

Figure 9:
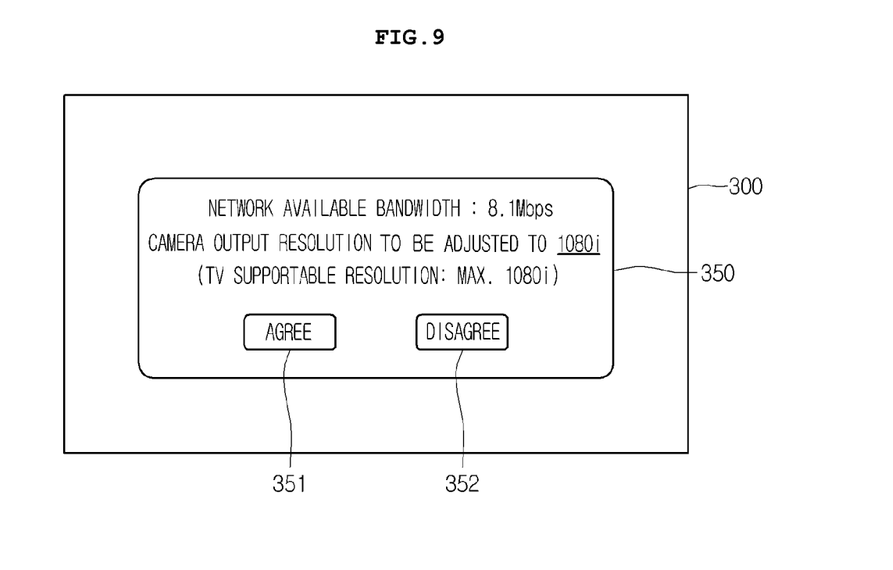

Referring to FIG. 9, when the available bandwidth of the network is determined to be "8.1 Mbps", the resolution adjusting unit 122 can adjust the output resolution of the camera 141 to "1080 p" with reference to the lookup table shown in FIG. 7; however, the resolution of "1080 p" may exceed the maximum supportable resolution "1080 i" of the display apparatus 10. In this case, the resolution adjusting unit 122 can adjust the output resolution of the camera 141 to "1080 i" by comparing the output resolution of the camera 141 which has been determined with reference to the lookup table with the supportable resolutions of the display apparatus 10. Information on various resolutions that the display apparatus 10 support can be prestored in the display apparatus 10, or may be updated in the display apparatus 10 by the server.

Meanwhile, the information on the network's available bandwidth, the resolution of the camera 141 to be adjusted to, and the maximum supportable resolution of the display apparatus 10 can be displayed on the screen 300 of the display apparatus 10 through the pop-up window 350. In that case, the pop-up window 350 may further include selectable buttons 351, 352 for the user to agree or disagree to changing the output resolution of the camera 141.

Figure 10:
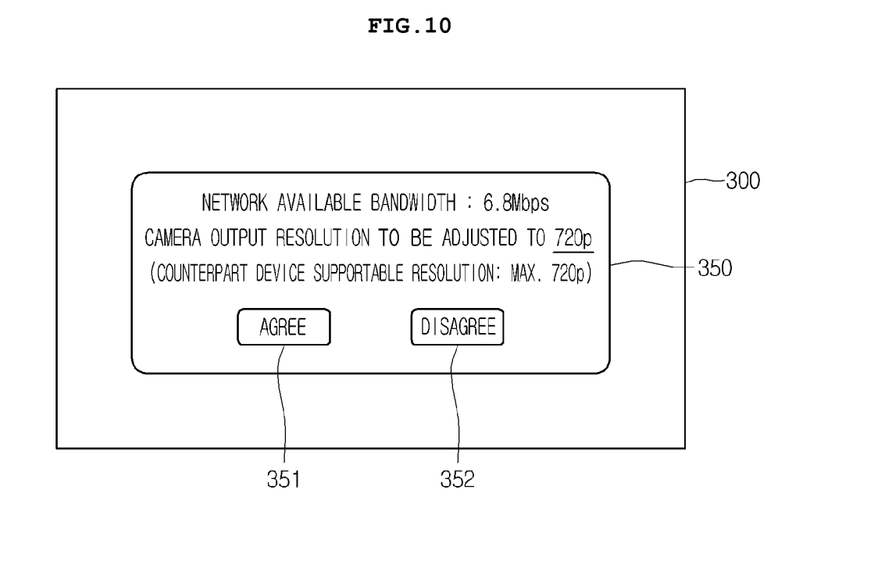

In another example, referring to FIG. 10, when the available bandwidth of the network is determined to be "6.8 Mbps", the resolution adjusting unit 122 can adjust the output resolution of the camera 141 to "1080 p" with reference to the lookup table shown in FIG. 7; however, the resolution of "1080 p" may exceed the maximum supportable resolution "720 p" of the video communication device 60 of the counterpart (i.e., the device of the other party involved in the video call with the user of the display apparatus 10). In this case, the resolution adjusting unit 122 of the display apparatus 10 can adjust the output resolution of the camera 141 associated with the display apparatus 10 to "720 p" by comparing the output resolution of the camera 141 which has been determined with reference to the lookup table with the supportable resolutions of the video communication device 60 of the counterpart. Here, information on the various resolutions that are supported by the video communication device 60 of the counterpart may be sent from the video communication device 60 (or server) to the display apparatus 10 for storage and/or updating.

According to another embodiment of the present invention, the information on the change in the output resolution of the camera 141 of the display apparatus 10 of the user can be transmitted to an external device, for example, the video communication device 60 of the counterpart or the video communication server (not shown), such that the information on the resolution change is displayed on the screen of the video communication device 60 of the counterpart and the counterpart can also recognize it. Further, before the output resolution of the camera 141 of the user's apparatus 10 is changed, a message can be sent from the apparatus 10 to the counterpart's communication device 60 which asks the counterpart whether or not the counterpart desires the change in the output resolution of the camera. If the counterpart agrees to the change, then the counterpart's message indicating the agreement to the change can be sent from the counterpart's device 60 to the display apparatus 10, which in turn then changes the output resolution of the camera 141 of the display apparatus 10.

Figure 11:
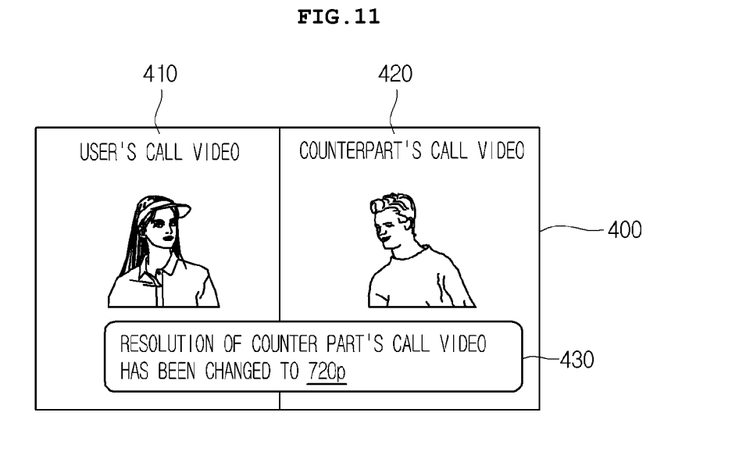

Referring to FIG. 11, when the output resolution of the camera 141 connected to the display apparatus 10 is changed to "720 p" by the method described above, the information on the resolution change can be transmitted to the video communication device 60 of the counterpart. In this case, information on the resolution change, for example, a pop-up window 430 saying "resolution of counterpart's call video has been changed to 720 p" can be displayed by the OSD on the screen 400 of the video communication device 60. In this way, the counterpart at the communication device 60 can know that the output resolution of the camera 141 of the other party at the display apparatus 10 has been changed. The screen 400 also displays the video 410 of the user at the communication device 60, and the video 420 of the user at the display apparatus 10.

According to another embodiment of the present invention, the display apparatus 10 can adjust the size, color, and/or frame rate of the displayed call video, in accordance with the detected available network bandwidth. For this purpose, the display apparatus 10 may further include a video adjusting unit that adjusts the size, color, and/or frame rate of the call video in accordance with the available bandwidth of the network. The video adjusting unit can be part of the controller 110 or video communication processor 120, or can be part of the controller/processor or the resolution adjusting unit 122 of the display apparatus of FIG. 4.

Figure 12:
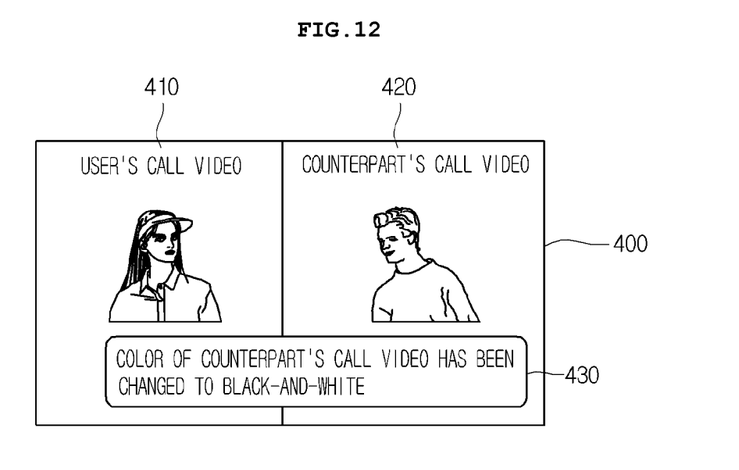
FIG. 12 is a diagram showing an embodiment of a method of changing the color of a video call image and transmitting the changed video call image.

FIG. 12 is a diagram showing an embodiment of a method of changing the color of a video call image and transmitting the changed video call image. The display apparatus 10 can adjust the color of the call video to be transmitted to the counterpart's video communication device into 256 colors or black-and-white, in accordance with the detected available bandwidth.

Referring to FIG. 12, the video adjusting unit of the display apparatus 10 involved in a video call operation can change the call video data into a black-and-white video (or any other color or configuration), when the detected available network bandwidth is below than a predetermined reference value. Information on the change in the color of the user's video can be sent from the display apparatus 10 to the video communication device 60, and then displayed in the window 430 on the screen 400 of the video communication device 60. A similar message indicating that the color of the user's call video has been changed to a certain color may be displayed on the screen of the display apparatus 10.

Figure 13:
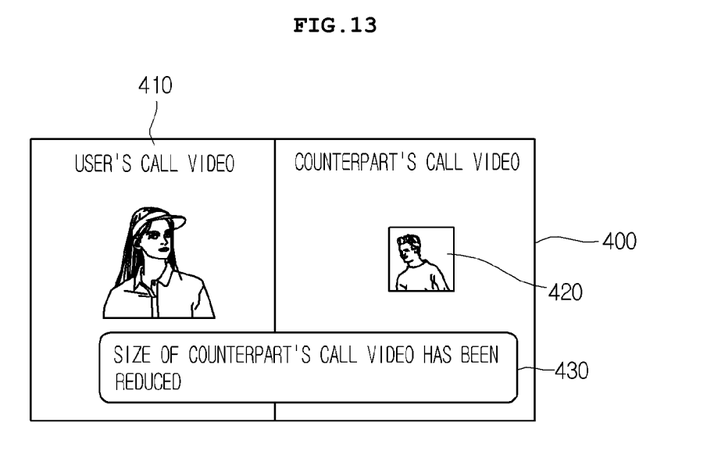
FIG. 13 is a diagram showing an embodiment of a method of changing the size of a video call image and transmitting the changed video call image.

FIG. 13 is a diagram showing an embodiment of a method of changing the size of a video call image and transmitting the changed video call image. The display apparatus 10 can adjust (e.g., increase, decrease or maintain) the size of the call video to be transmitted to the counterpart's video communication device 60, in accordance with the detected network's available bandwidth. Referring to FIG. 13, the video adjusting unit of the display apparatus 10 involved in a video call can decrease the size of the call video, as the network's available bandwidth decreases, and the call video of the user in the adjusted size can be sent and displayed on the screen of the communication device 60 in the smaller size 420. A message 430 indicating this change may also be displayed on the screen 400 of the communication device 60. Similarly, a message indicating that the size of the user's video is changed (reduced or enlarged) may be displayed on the screen of the user's display apparatus 10 as the user's video is displayed accordingly thereon.

Meanwhile, the video adjusting unit of the display apparatus 10 can adjust (e.g., decrease, increase or maintain) the frame rate of the call video, as the network's available bandwidth decreases. As such, as the network available bandwidth decreases (or increases) as described above, the video adjusting unit decreases (or increases or changes) the color, size, and/or frame rate of the call video, such that the video data transmitted from the display apparatus 10 can be in a most suitable format or configuration.

According to another embodiment of the present invention, the display apparatus 10 transmits only the voice data while preventing the video data from being transmitted to the other party's device. In an example, only the voice call may be possible, when the detected available network bandwidth decreases below a predetermined reference value.

Figure 14:
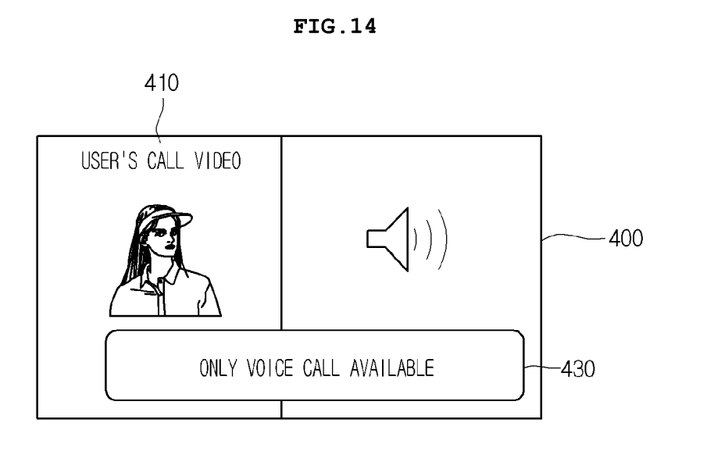
FIGS. 14 to 16 are diagrams showing embodiments of a method of transmitting data when the available bandwidth of a network is less than a reference value.
Figure 15:
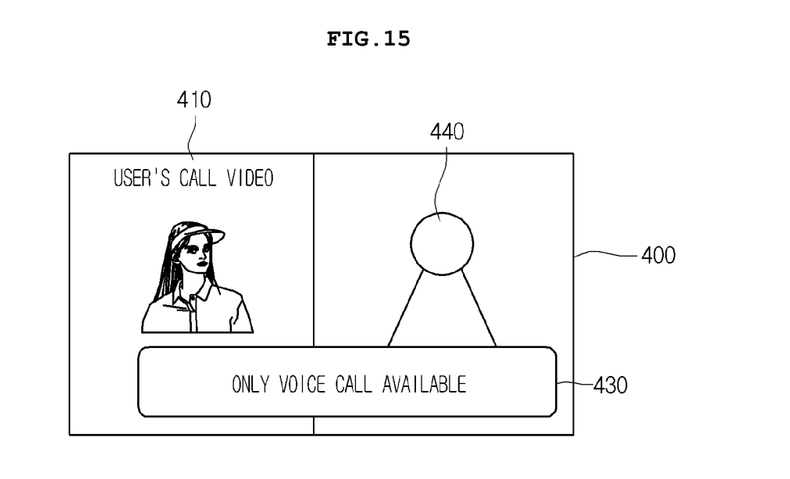
Figure 16:
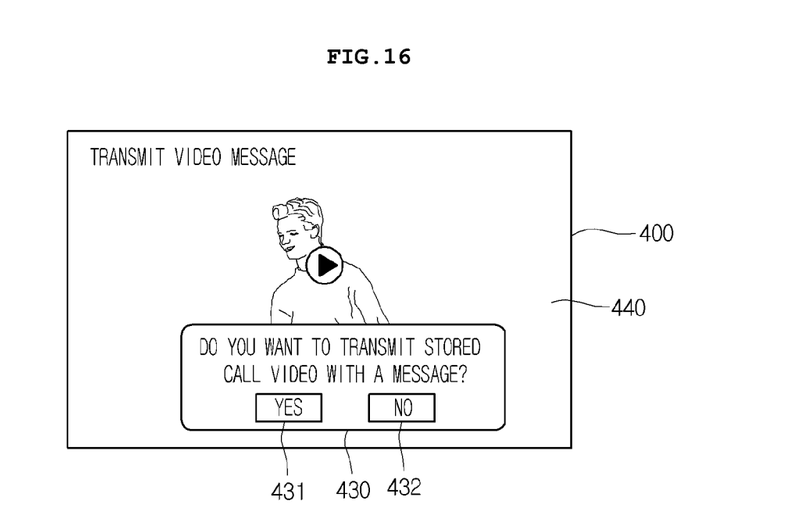

FIGS. 14 to 16 are diagrams showing examples of a method of transmitting data when the available bandwidth of a network is less than a reference value.

Referring to FIG. 14, the display apparatus 10 can stop or prevent the video data acquired by the camera 141 from being transmitted, when the network's available bandwidth that has been measured by the network monitoring unit 121 decreases below the predetermined reference value. In this case, information that only a voice call is available or allowed can be shown on the screen 100 to inform the user, until the network available bandwidth is restored above the reference value. Here the screen 100 can be the screen of the call parties, e.g., the screen of the display apparatus 10 and/or the screen of the communication device 60.

In another example as shown in FIG. 15, a pre-stored video 440, for example an avatar set in advance by the user (or the counterpart) can be displayed on the screen 400, instead of the counterpart's call video transmitted through the network.

When the network's available bandwidth decreases below a reference value, as described above, the camera 141 may stop operating such that the user's video data is not outputted, or the camera 141 keeps acquiring and outputting the user's video data. Further, the user's call video data outputted from the camera 141 may not be transmitted to the counterpart's video communication device when the network's available bandwidth is below the reference value; however, it can be stored in the memory 130 and the stored call video can be then transmitted to the counterpart as s video message.

Referring to FIG. 16, when the network's available bandwidth is restored above the reference value, the call video stored as described above can be transmitted as a video message. For example, when a current user selects a "yes" button 431 in the buttons 431, 432 displayed in a pop-up window 430 of the display apparatus 10 (or the communication device 60) to request a transmission of a video message, the call video data stored in the memory 130 of the display apparatus 10 (or the communication device 60) can be transmitted in a format of a video message to the counterpart video communication device 60 (or the display apparatus 60) while the network available bandwidth is below the reference value.

The methods of controlling a display apparatus according to the embodiments of the present invention for a video call may be programmed to be executed by one or more computers and stored in one or more computer-readable recording media, in which the computer-readable recording media may be ROM, RAM, CD-ROM, magnetic tape, floppy disc, and optical data storage, and may be implemented in a carrier wave type (e.g. transmitted by the internet).

Further, the computer-readable recording media can be distributed on computer systems connected through the network, and thus the computer-readable recording media may be stored and executed as the computer-readable code by a distribution scheme. Further, functional programs, codes, and code segments for implementing the control methods of the invention can be inferred by programmers in the related art.

Although preferred embodiments of the present invention have been illustrated and described, the present invention is not limited to the above-mentioned embodiments and various modifications can be made by those skilled in the art without the scope of the appended claims of the present invention. In addition, these modified embodiments should not be appreciated separately from technical spirits or prospects.

What is claimed is:

1. A method of controlling a digital TV (DTV) that can perform video communication with an external apparatus in a video call operation by using a camera associated with the DTV, the method comprising:

detecting, by the DTV, an available bandwidth of a network for transmitting video call data in the video call operation;

generating a control signal for adjusting an output resolution of the camera in accordance with at least the detected available bandwidth, using a lookup table, the lookup table storing therein a plurality of available bandwidths in association with a plurality of available video resolutions;

transmitting, by the DTV to the camera, the control signal for adjusting the output resolution of the camera in accordance with the detected available bandwidth; and transmitting, by the DTV to the external apparatus, video data received from the camera in the adjusted output resolution of the camera for the video call operation.

2. The method of controlling a DTV according to claim 1, wherein the control signal is for reducing or increasing the output resolution of the camera.

3. The method of controlling a DTV according to claim 1, further comprising:

generating the control signal for adjusting the output resolution of the camera, in accordance with the detected available bandwidth and at least one of a supportable resolution of the DTV and a supportable resolution of a counterpart's video communication device.

4. The method of controlling a DTV according to claim 1, further comprising:

displaying at least one of information on the detected available bandwidth and information of the output resolution adjustment, when the output resolution of the camera is adjusted according to the control signal.

5. The method of controlling a DTV according to claim 1, further comprising:
transmitting, by the DTV to the external apparatus, information on the output resolution adjustment based on the adjusted output resolution of the camera for the video call operation.

6. The method of controlling a DTV according to claim 1, further comprising:
displaying, on a screen of the DTV, information on the detected available bandwidth and information on a new output resolution of the camera to which the camera can adjust based on the detected available bandwidth.

7. The method of controlling a DTV according to claim 6, further comprising:
receiving, by the DTV, a user input in response to the information on the new output resolution of the camera; and
adjusting, by the DTV, the output resolution of the camera to the new output resolution according to the user input.

8. The method of controlling a DTV according to claim 1, further comprising:
adjusting, by the DTV, at least one of a size, a color, and a frame rate of a displayed call video of the video call operation, in accordance with the detected available bandwidth.

9. A digital TV (DTV) that can perform video communication with an external apparatus in a video call operation by using a camera associated with the DTV, the DTV comprising:
a storage unit configured to store therein a lookup table, the lookup table identifying a plurality of available bandwidths in association with a plurality of available video resolutions;
at least one processor configured to detect an available bandwidth of a network for transmitting video call data in the video call operation, to generate a control signal for adjusting an output resolution of the camera in accordance with the detected available bandwidth, using the lookup table, and to transmit the control signal; and
a communication unit configured to transmit, to the external apparatus, video data received from the camera in the adjusted output resolution of the camera for the video call operation.

10. The DTV according to claim 9, wherein the at least one processor includes a network monitoring unit and a resolution adjusting unit.

11. The DTV according to claim 9, wherein the control signal is for reducing or increasing the output resolution of the camera.

12. The DTV according to claim 9, wherein the at least one processor is further configured to:
generate the control signal for adjusting the output resolution of the camera, in accordance with the detected available bandwidth and at least one of a supportable resolution of the DTV and a supportable resolution of a counterpart's video communication device.

13. The DTV according to claim 9, further comprising:
a display unit configured to display at least one of information on the detected available bandwidth and information of the output resolution adjustment, when the output resolution of the camera is adjusted according to the control signal.

14. The DTV according to claim 9, wherein the communication unit further transmits to the external apparatus information on the output resolution adjustment based on the adjusted output resolution of the camera for the video call operation.

15. The DTV according to claim 9, further comprising:
a display unit configured to display information on the detected available bandwidth and information on a new output resolution of the camera to which the camera can adjust based on the detected available bandwidth.

16. The DTV according to claim 15, further comprising:
an input unit configured to receive a user input in response to the information on the new output resolution of the camera,
wherein the at least one processor adjusts the output resolution of the camera to the new output resolution according to the user input.

17. The DTV according to claim 9, wherein the at least one processor is further configured to:
adjust at least one of a size, a color, and a frame rate of a displayed call video of the video call operation, in accordance with the detected available bandwidth.

18. A digital TV (DTV) that can perform video communication with an external apparatus associated with a camera in a video call operation, the DTV comprising:
a communication unit configured to receive, from the external apparatus, video data of the video call operation in an adjusted output resolution of the camera associated with the external apparatus, and to receive information on the adjusted output resolution;
a display unit; and
at least one processor configured to control the display unit to display the received video data of the video call operation in the adjusted output resolution, and to display the received information on the adjusted output resolution as an on-screen display (OSD).

* * * * *